United States Patent
Wolff et al.

(10) Patent No.: US 10,135,968 B2
(45) Date of Patent: Nov. 20, 2018

(54) SYSTEM AND METHOD FOR ACOUSTIC ECHO CANCELLATION

(71) Applicant: Nuance Communications, Inc., Burlington, MA (US)

(72) Inventors: Tobias Wolff, Neu-Ulm (DE); Anirudha Kalya, Gainesville, FL (US)

(73) Assignee: Nuance Communications, Inc., Burlington, MA (US)

( * ) Notice: Subject to any disclaimer, the term of this patent is extended or adjusted under 35 U.S.C. 154(b) by 252 days.

(21) Appl. No.: 14/784,539

(22) PCT Filed: Apr. 15, 2013

(86) PCT No.: PCT/US2013/036597
§ 371 (c)(1),
(2) Date: Oct. 14, 2015

(87) PCT Pub. No.: WO2014/171915
PCT Pub. Date: Oct. 23, 2014

(65) Prior Publication Data
US 2016/0044159 A1    Feb. 11, 2016

(51) Int. Cl.
H04M 9/08        (2006.01)
H04M 3/00        (2006.01)

(52) U.S. Cl.
CPC .......... *H04M 3/002* (2013.01); *H04M 9/082* (2013.01)

(58) Field of Classification Search
CPC ...... H04M 9/082; H04M 3/002; H04M 3/568; H04M 1/6041; H04M 9/085;
(Continued)

(56) References Cited

U.S. PATENT DOCUMENTS 5,528,627 A * 6/1996 Yanagi .............. H04B 1/123
                                                       375/232
5,608,804 A * 3/1997 Hirano .............. H03H 21/0012
                                                     379/406.08

(Continued)

FOREIGN PATENT DOCUMENTS

EP        0821513 A1    1/1998

OTHER PUBLICATIONS

International Search Report and Written Opinion issued in related International Application Serial No. PCT/US2013/036597 dated Jul. 10, 2013.

(Continued)

*Primary Examiner* — Akelaw Teshale
(74) *Attorney, Agent, or Firm* — Brian J. Colandreo; Michael T. Abramson; Holland & Knight LLP

(57) ABSTRACT

A system and method for acoustic echo cancellation is provided. Embodiments may include receiving, at one or more microphones, an audio reference signal from an audio speaker. Embodiments may also include filtering the audio reference signal using one or more adaptive audio filters. Embodiments may further include analyzing a level of signal energy of the audio reference signal with regard to time, frequency and audio channel to identify at least one maximum error contribution point. Embodiments may also include updating the one or more adaptive audio filters based upon, at least in part, the analyzed audio reference signal.

20 Claims, 6 Drawing Sheets

(58) Field of Classification Search
CPC ....... H04M 2203/509; H04M 2250/62; H04M 3/567; H04M 9/08; H04M 19/044; H04M 1/72569; G10L 2021/02082; G10L 21/0208; G10L 2021/02166; G10L 21/0264; H04R 3/005
USPC ..... 381/66, 71.1, 92, 94.1, 57, 107, 26, 300, 381/306, 318, 406.08, 202.01, 406.01, 381/406.03, 406.05, 406.06
See application file for complete search history.

(56) References Cited

U.S. PATENT DOCUMENTS

| | | | | |
|---|---|---|---|---|
| 5,692,053 A | * | 11/1997 | Fuller ................. | G10K 11/178 381/71.3 |
| 9,728,178 B2 | * | 8/2017 | Sugiyama .............. | G10K 11/16 |
| 2002/0154761 A1 | * | 10/2002 | McLaughlin ........... | H04M 9/08 379/388.01 |
| 2009/0238373 A1 | * | 9/2009 | Klein .................... | H04M 9/082 381/66 |
| 2010/0166199 A1 | * | 7/2010 | Seydoux ............... | H04M 9/082 381/66 |
| 2010/0223311 A1 | * | 9/2010 | Sugiyama ............. | H04M 9/082 708/322 |
| 2011/0096811 A1 | * | 4/2011 | Vetterli ............... | H04L 25/0212 375/130 |
| 2014/0205105 A1 | * | 7/2014 | Cleve ....................... | H04R 3/02 381/66 |

OTHER PUBLICATIONS

Notification Concerning Transmittal of International Preliminary Report on Patentability in corresponding International Application No. PCT/US2013/036597, dated Oct. 29, 2015 (7 pages).
Supplemental European Search Report received in corresponding International Application No. PCT/US2013/036597, dated Nov. 8, 2016 (9 pages).
Hongyang Deng et al., "New Sparse Adaptive Algorithms Using Partial Update," Acoustics, Speech, and Signal Processing, 2004, Proceedings (ICASSP '04) IEEE International Conference on Montreal, Quebec, Canada pp. 17-21, May 2004, Piscataway, NJ, USA, IEEE, Piscataway, NJ, USA vol. 2, May 17, 2004, (May 17, 2004) pp. 845-848.

* cited by examiner

SYSTEM AND METHOD FOR ACOUSTIC ECHO CANCELLATION

RELATED APPLICATIONS

The subject application is a U.S. National Stage Application of International Application No. PCT/US2013/036597, filed on Apr. 15, 2013, the contents of which are herein incorporated by reference in its entirety.

TECHNICAL FIELD

This disclosure relates to acoustic echo cancellation (AEC) and, more particularly, to a method for acoustic echo cancellation using an updated adaptive filtering approach.

BACKGROUND

In the area of speech recognition, some voice controlled devices have a feature called "barge-in". This feature allows the user to interrupt the speech dialog system during a speech prompt, or while some other audio signal is being transmitted. For example, for voice controlled navigation devices this may shorten the dialog considerably, as it is no longer needed to listen to the entire prompt, one which may already be known to the user. Further, in the case of a voice controlled television, the television may be playing the current television audio signal while the recognition engine has to decode the user's utterance at the same time. In this way, various signal processing techniques may be applied to the microphone signals in order to remove the prompt or television signal respectively. Thus, the system will no longer respond to this acoustic "echo". This type of signal processing technique is referred to as Acoustic Echo Cancellation (AEC). Accordingly, in order to cancel out acoustic echoes in a microphone signal, the signal that is played back over the loudspeaker(s) has to be available for speech enhancement. If so, a filter may be applied to this reference signal such that an optimum estimate for the actual echo component at the microphone is obtained. This estimate may then be removed.

SUMMARY OF DISCLOSURE

In one implementation, a method, in accordance with this disclosure, may include receiving, at one or more microphones, an audio reference signal from an audio speaker. The method may also include filtering the audio reference signal using one or more adaptive audio filters. The method may further include analyzing a level of signal energy of the audio reference signal with regard to time, frequency and audio channel to identify at least one maximum error contribution point. The method may also include updating the one or more adaptive audio filters based upon, at least in part, the analyzed audio reference signal.

One or more of the following features may be included. In some embodiments, updating may include applying an $\mathcal{L}$-Max update based upon, at least in part, the analysis of time, frequency and audio channel signal energy. In some embodiments, updating may include updating a sub-band adaptive filter. In some embodiments, updating may include applying at least one sparse update to one or more sub-band adaptive filters. The method may further include applying a constraint to updating based upon, at least in part, one or more set parameters, wherein the constraint is configured to limit an amount of processing required for updating. In some embodiments analyzing may include a sparsity determination. The method may also include determining a particular sub-band filter to update. In some embodiments, the microphone may be associated with at least one of a voice controlled television, an in-vehicle system, and a hands-free telephone system. The acoustic echo cancellation system may be a multi-channel acoustic echo cancellation system. The method may further include removing an echo component associated with the audio reference signal.

In another implementation, a system for acoustic echo cancellation is provided. The system may include one or more processors configured to receive an audio reference signal from an audio speaker, the one or more processors further configured to filter the audio reference signal using one or more adaptive audio filters, the one or more processors further configured to analyze a level of signal energy of the audio reference signal with regard to time, frequency and audio channel to identify at least one maximum error contribution point, the one or more processors further configured to update the one or more adaptive audio filters based upon, at least in part, the analyzed audio reference signal.

One or more of the following features may be included. In some embodiments, updating may include applying an $\mathcal{L}$-Max update based upon, at least in part, the analysis of time, frequency and audio channel signal energy. In some embodiments, updating may include updating a sub-band adaptive filter. In some embodiments, updating may include applying at least one sparse update to one or more sub-band adaptive filters. The method may further include applying a constraint to updating based upon, at least in part, one or more set parameters, wherein the constraint is configured to limit an amount of processing required for updating. In some embodiments analyzing may include a sparsity determination. The method may also include determining a particular sub-band filter to update. In some embodiments, the microphone may be associated with at least one of a voice controlled television, an in-vehicle system, and a hands-free telephone system. The acoustic echo cancellation system may be a multi-channel acoustic echo cancellation system. The method may further include removing an echo component associated with the audio reference signal.

The details of one or more implementations are set forth in the accompanying drawings and the description below. Other features and advantages will become apparent from the description, the drawings, and the claims.

DETAILED DESCRIPTION OF THE EMBODIMENTS

Embodiments provided herein are directed towards reducing the computational complexity of acoustic echo cancellation systems by exploiting properties of the played-back audio signals. An AEC algorithm often includes both filtering the played-back signals (i.e., reference signals) and updating the filters in order to adjust them for optimal performance. Generally, filtering and updating may cause a similar computational load. Embodiments of AEC process 10 described herein are directed towards reducing the efforts required to perform the update. In this way, AEC process 10 may be configured to analyze the signal energy across channels, frequency and time and may update the AEC filter(s) only in certain identified areas. It is understood that updating only the $\mathcal{L}$ coefficients of the AEC filter that would get the largest update (i.e., $\mathcal{L}$-Max) may reduce the complexity. AEC process 10 described herein may be configured to further extend this concept with respect to frequency as well as across channels.

As used herein, the term "near-talk device" may refer to a device that is physically closer to an audio source than a "far-talk device". The near-talk and far-talk devices described herein may be any suitable electronic device such as the computing devices discussed above. Additionally and/or alternatively, one or more of the near-talk device and the far-talk device may correspond to devices other than traditional computing devices, for example, remote control devices incorporating one or more microphones, or any device incorporating audio recording functionality, etc. As used herein, the phrase "audio source" may refer to any source of sound, for example, a user's mouth, etc.

Figure 1:
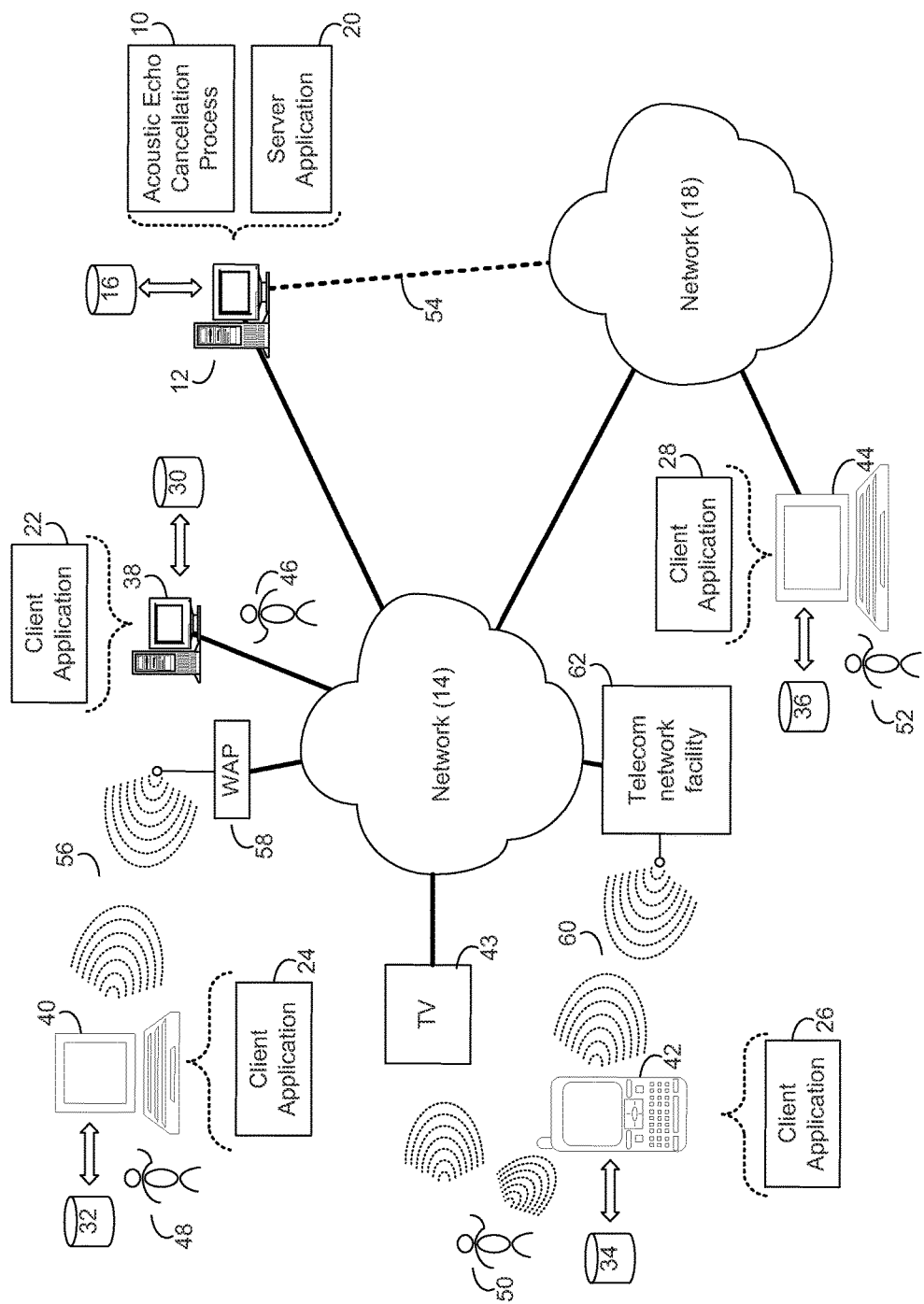
FIG. 1 is a diagrammatic view of an acoustic echo cancellation process in accordance with an embodiment of the present disclosure.

Referring to FIG. 1, there is shown an acoustic echo cancellation process 10 that may reside on and may be executed by any of the devices shown in FIG. 1, for example, computer 12, which may be connected to network 14 (e.g., the Internet or a local area network). Server application 20 may include some or all of the elements of acoustic echo cancellation process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-6, acoustic echo cancellation process 10 may include receiving (602), at one or more microphones, an audio reference signal from an audio speaker. The method may also include filtering (604) the audio reference signal using one or more adaptive audio filters. The method may further include analyzing (606) a level of signal energy of the audio reference signal with regard to time, frequency and audio channel to identify at least one maximum error contribution point. The method may also include updating (608) the one or more adaptive audio filters based upon, at least in part, the analyzed audio reference signal.

The instruction sets and subroutines of acoustic echo cancellation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, acoustic echo cancellation process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of acoustic echo cancellation process 10. Accordingly, acoustic echo cancellation process 10 may be a purely server-side application, a purely client-side application, or a hybrid server-side/client-side application that is cooperatively executed by one or more of client applications 22, 24, 26, 28 and acoustic echo cancellation process 10.

Client electronic devices 38, 40, 42, 43, 44 may each execute an operating system, examples of which may include but are not limited to Apple iOS™, Microsoft Windows™, Android™, Redhat Linux™, or a custom operating system. Each of client electronic devices 38, 40, 42, 43, and 44 may include one or more microphones and/or speakers configured to implement acoustic echo cancellation process 10 as is discussed in further detail below.

Users 46, 48, 50, 52 may access computer 12 and acoustic echo cancellation 10 directly through network 14 or through secondary network 18. Further, computer 12 may be connected to network 14 through secondary network 18, as illustrated with phantom link line 54. In some embodiments, users may access acoustic echo cancellation 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 and server computing device 12. This particular type of arrangement is discussed in further detail with reference to FIGS. 2-3, which are discussed in further detail below.

Figure 2:
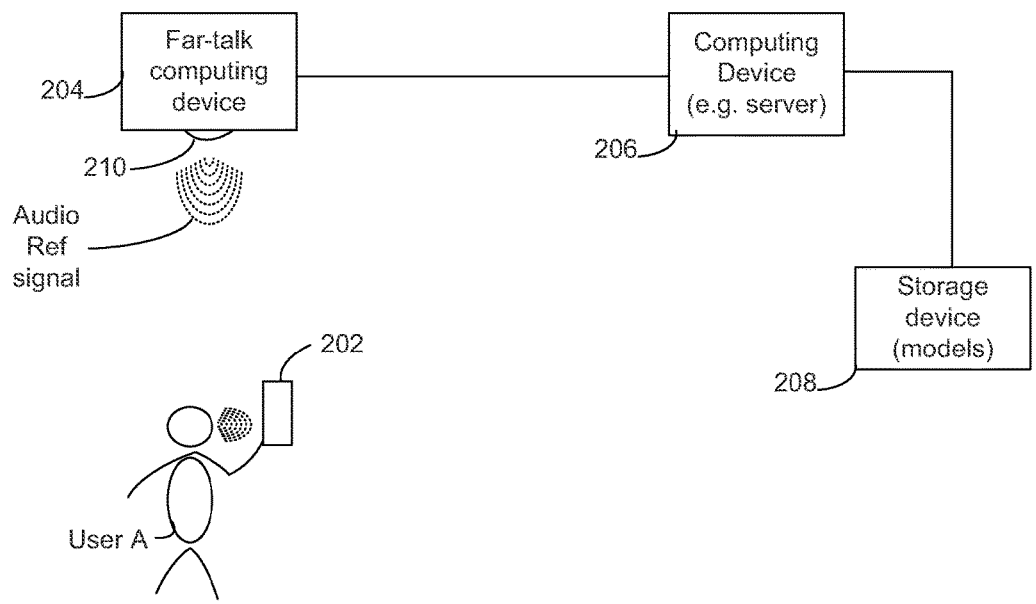
FIG. 2 is a diagrammatic view of a system configured to implement an acoustic echo cancellation process in accordance with an embodiment of the present disclosure.

Referring now to FIG. 2, an embodiment of acoustic echo cancellation process 10 shown within an example of an automatic speech recognition ("ASR") system 200 is depicted. In this particular embodiment, system 200 may include near-talk device 202, far-talk device 204, computing device 206, and one or more storage devices 208, which may be configured to store various ASR models and transforms. In some embodiments, computing device 206 and the one or more storage devices 208 may have a similar configuration to that of server computing device 12 and storage device 16 described above with reference to FIG. 1.

In the particular embodiment depicted in FIG. 2, near-talk computing device 202 may be a cellphone, television remote control, or any other suitable device having one or more microphones (e.g. User A's cellphone, etc.). Far-talk computing device 204 may correspond to a television such as television 43 shown in FIG. 1. Television 43 may include one or more audio speakers configured to produce an audio reference signal from an associated audio speaker (e.g. audio speaker 210). This audio reference signal may be received (602) at one or more microphones, for example, those associated with near-talk computing device 202.

As shown in FIG. 2, near-talk computing device 202 may be physically closer to User A than far-talk device 204. It should be noted that although much of the discussion included herein is directed towards the example of using a television as the far-talk device, this is merely for purposes of example. Acoustic echo cancellation process 10 may be used in accordance with any suitable device and in any suitable venue. For example, the teachings of the present disclosure may be configured to operate in a vehicle such as an automobile or in any other situation that may include both a near-talk and far-talk device as defined above.

In some embodiments, acoustic echo cancellation process 10 may be configured to filter (604) the audio reference signal using one or more adaptive audio filters, which may be configured to suppress and/or attenuate portions of the received audio signals. The size of the required filter strongly depends on room acoustics. In a car environment for instance, a filter length of approximately 50 ms is typically sufficient, whereas in a living room a filter length of approximately 200 ms. In the latter case the computational complexity of the filter is raised by a factor of 4 compared to the in-car scenario.

As discussed herein, in some embodiments, AEC process 10 may be used in conjunction with a television such as television 43 shown in FIG. 1. In this type of application there may be some number of audio channels (e.g., two, five or even seven audio channels) played back simultaneously (e.g., in a stereo or surround sound environment). As a consequence, multichannel AEC ("MAEC") may be necessary which again raises the costs of the AEC filters because every reference channel may require its own filter. If multiple microphones are used to enhance the speech signal, it may consume even more computational resources. In a television application, for example, these costs may prevent implementation of such a system as a real-time system on a modern CPU or DSP. Accordingly, for multichannel AEC with multiple microphones, methods to reduce the complexity of AEC are needed. Similarly, this applies to mono AEC with a single microphone as in a hands-free scenario. AEC process 10 may be used to address these types of scenarios as well as numerous others.

In some embodiments, AEC process 10 may utilize a normalized least means squares algorithm ("NLMS"). Here, the update equation for a length "$\mathcal{L}$" adaptive filter $\underline{h}(k)$ is given by:

$$\underline{h}(k+1) = \underline{h}(k) + \beta \cdot \frac{e(k) \cdot \underline{X}(k)}{\|\underline{X}(k)\|_2} \qquad \text{Equation 1}$$

where k is the discrete time index and $\underline{X}(k):=[x_0(k) x_1(k) \ldots x_{L-1}(k)]^T$ is the vector of the last L reference input samples. The above update equation is often referred to as the normalized least mean squares algorithm (NLMS-algorithm) that minimizes the error signal e (k) in the mean square sense. The parameter β is the stepsize. For details on adaptive filters and algorithms for their adaptation please see S. S. Haykin, "Adaptive Filter Theory", *Prentice Hall*, Englewood Cliffs, N.J., 2002, and E. Hansler and G. Schmidt, "Acoustic Echo and Noise Control", John Wiley & Sons, New York, N.Y., 2004, which are both incorporated by reference herein in their entirety.

In some embodiments, in order to reduce the computational complexity of the NLMS, one approach is to update only those coefficients that would contribute the most to the remaining error. For example, those filtertaps 1 with the largest excitation magnitude $|x_l(k)|$. Selecting these filtertaps can be denoted with the matrix Q (k), so the update equation reads:

$$\underline{h}(k+1) = \underline{h}(k) + Q(k) \cdot \beta \cdot \frac{e(k) \cdot \underline{X}(k)}{\|\underline{X}(k)\|_2} \qquad \text{Equation 2}$$

Here, Q(k) is defined as $Q(k):=\text{diag}[\underline{q}(k)]$ with $\underline{q}(k)$ indicating the $\mathcal{L}$ largest input samples:

$$q_l(k) = \begin{cases} 1, & |x_l(k)| \in \mathcal{L} \text{maxima of } |\underline{X}(k)| \\ 0, & \text{otherwise} \end{cases} \qquad \text{Equation 3}$$

$l = 0, 1, \ldots, L-1$

Note that this describes the mechanism algorithmically but does not save any multiplications in this form. The multiplications with 0 would be omitted in an actual implementation of course. Given the input vector $\underline{X}(k)$ is null for all taps except for the those where $q_i(k)=1$, at all times k, the convergence behavior will certainly be the same as without the selection matrix Q(k). At the same time the efforts for filter adaptation have been reduced. If large parts of the signal energy are concentrated in a few taps of the signal vector, the signal is said to be sparse. This signal property is exploited by the $\mathcal{L}$-Max partial update scheme. Hence, the $\mathcal{L}$-Max approach makes use of temporal sparsity.

Note that generating $\underline{q}(k)$ requires sorting, which means an additional overhead. Here, efficient implementations such as the sortline algorithm (see, I. Pitas, "Fast Algorithms for Running Ordering and Max/Min Calculation", *IEEE Transactions on Circuits and Systems*, vol. 36, no. 6, pp. 795-804, June 1989) can be used such that the overall load will be below the original NLMS load. $\mathcal{L}$-Max was first proposed in T. Aboulnasr and K. Mayyas, "Complexity Reduction of the NLMS Algorithm via Selective Coefficient Update", *IEEE Transactions on Signal Processing*, vol. 47, pp. 1421-1424. (1997).

In P. O. Hoyer, "Non-negative Matrix Factorization With Sparseness Constraints," *Journal of Machine Learning Research*, vol. 49, pp. 1208-1215, June 2001, Hoyer proposed a sparsity measure for a signal vector $\underline{x}:=[x_0, x_1, \ldots, x_{N-1}]^H \in \mathbb{C}^N$ based on comparing its $L_1$ and $L_2$ norm respectively:

$$S_{hoy}(\underline{x}) := \frac{2N}{2N - \sqrt{2N}} \cdot \left(1 - \frac{\|x\|_1}{\sqrt{2N}\,\|x\|_2}\right) \quad \text{Equation 4}$$

See also J. Benesty, C. Paleologu, T. Gansler, S. Ciochina: "A Perspective On Stereophonic Acoustic Echo Cancellation". *Springer Topics in Signal Processing*, vol. 4, (2011). It can be shown that $0 \leq S_{hoy}(\underline{x}) \leq 1$ and that $S_{hoy}(\underline{x})$ is invariant with respect to scaling: $S_{hoy}(\underline{x}) = S_{hoy}(a \cdot \underline{x})$. As desired, the larger the proposed measure, the sparser the vector $\underline{x}$ (see, J. Benesty, C. Paleologu, T. Gansler, S. Ciochina: "A Perspective On Stereophonic Acoustic Echo Cancellation", *Springer Topics in Signal Processing*, vol. 4, (2011)).

Figure 3:
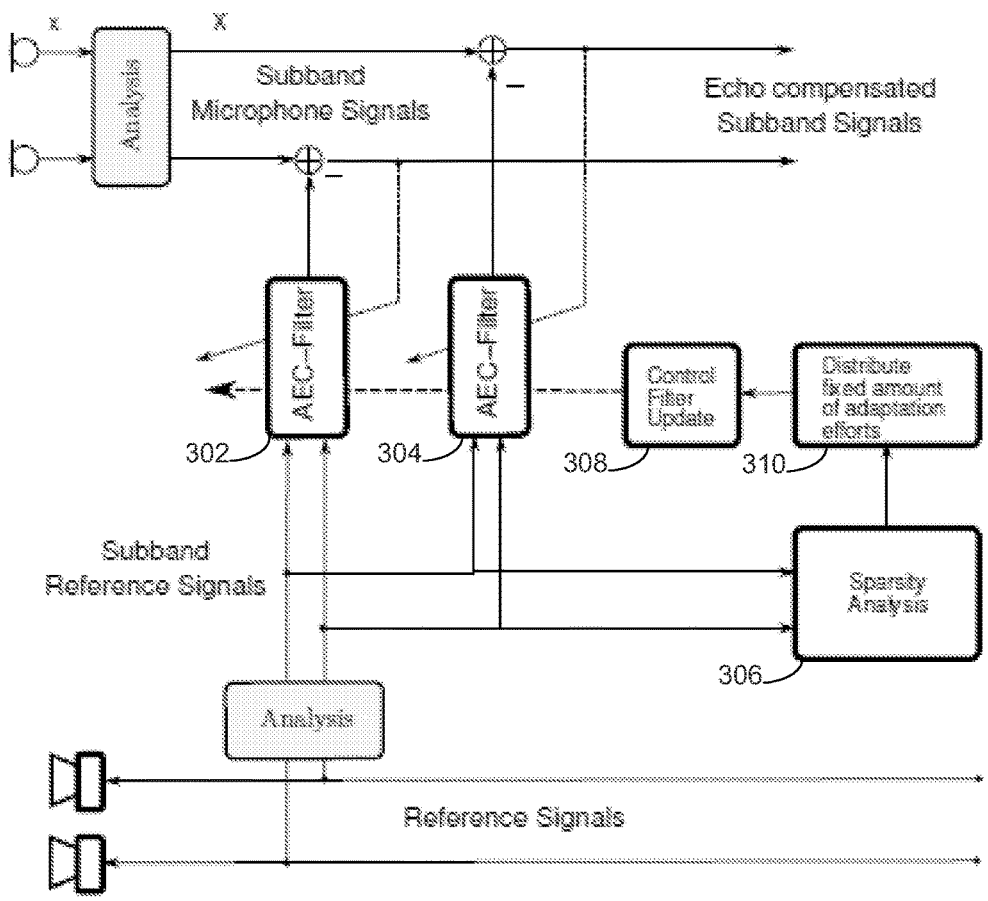
FIG. 3 is a diagrammatic view of a system configured to implement an acoustic echo cancellation process in accordance with an embodiment of the present disclosure.

Referring now to FIG. 3, an embodiment of a system 300 configured to implement AEC process 10 is provided. System 300 may include a number of filters 302, 304. Filters 302, 304 may be of any suitable design, for example, adaptive acoustic filters as are discussed in further detail below. System 300 may further include sparsity analysis module 306, control filter update module 308, and constraint module 310. Sparsity analysis module 306 may be configured to apply at least one sparse update to one or more of filters 302, 304. In some embodiments, AEC process 10 may update one or more sub-band adaptive filters based upon a multi-dimensional sparsity analysis as is discussed in further detail below. AEC process 10 may be configured to remove any echo component associated with the received audio reference signals as shown in FIG. 3.

In some embodiments, AEC process 10 may incorporate a multi-channel sub-band (frequency selective) AEC implementation. In this way, AEC process 10 may be configured to analyze (606) a level of signal energy of the audio reference signal with regard to time, frequency and audio channel to identify at least one maximum error contribution point. Accordingly, embodiments of AEC process 10 may update only the points in the 3-D time-frequency-channel space that contribute the most to the error. Additionally and/or alternatively, AEC process 10 may be configured to set a threshold amount of processing to some predefined amount.

As discussed above, AEC process 10 may analyze the multi-channel reference signals along time, frequency as well as across channels. Then, a function may be applied that determines how to allocate resources to the respective sub-bands and channels (e.g., in terms of the number of coefficients that are allowed to be updated). In this way, some filters (e.g., at a particular frequency and channel) may have no coefficients adapted at all, whereas others get only some of their coefficients renewed. Only those considered as most important, will get all their coefficients refreshed. The $\mathcal{L}$-Max approach may finally be used to decide which coefficients (e.g., at a given channel and sub-band) in particular will finally receive an update. Various $\mathcal{L}$-Max options may be available as is discussed in further detail hereinbelow.

Figure 4:
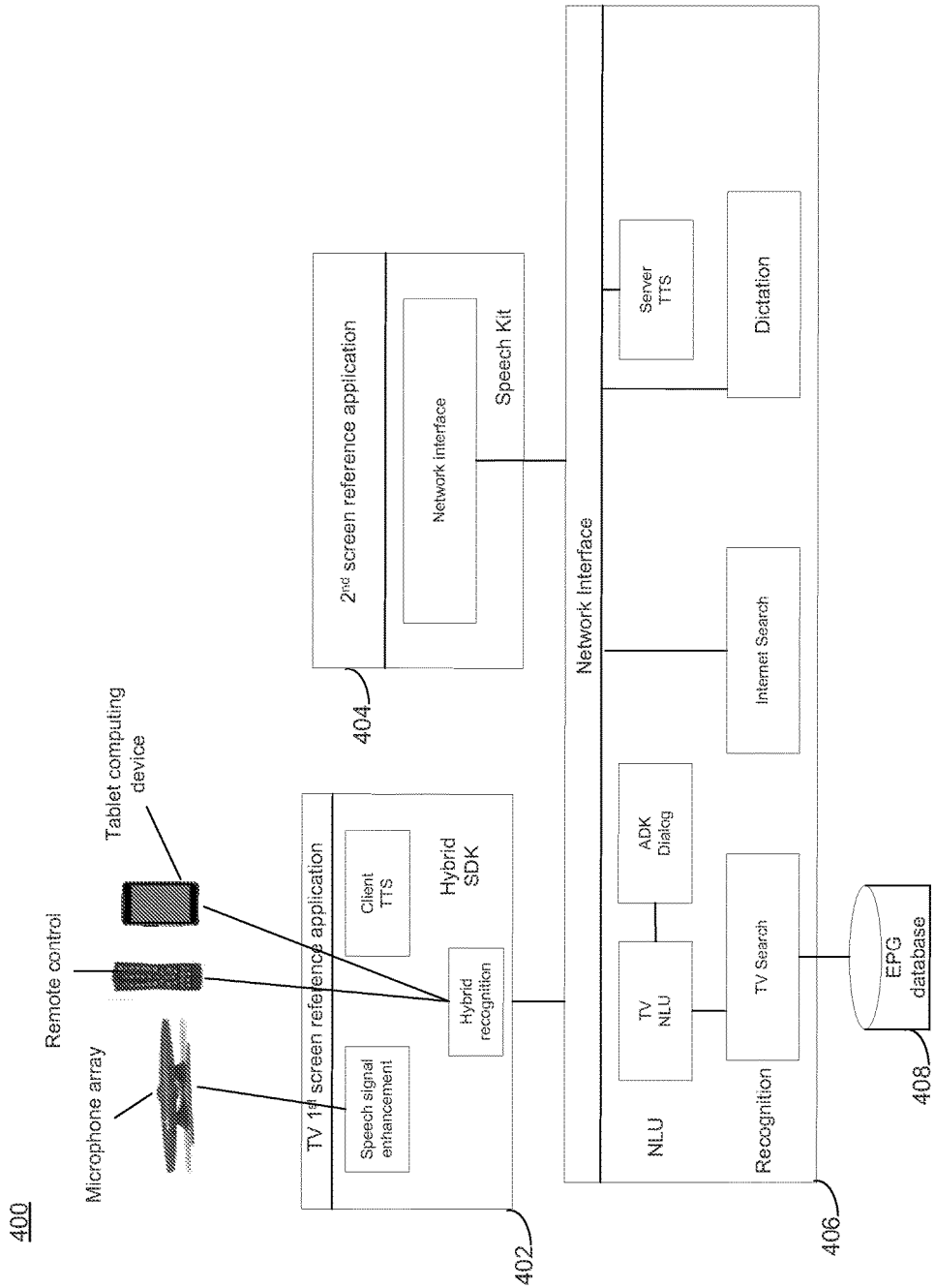
FIG. 4 is a diagrammatic view of a system configured to implement an acoustic echo cancellation process in accordance with an embodiment of the present disclosure.

Embodiments of AEC process 10 may be used in conjunction with a variety of different systems. For example, one application may involve voice controlled televisions having surround sound with one or more microphones (e.g. 2, 4, etc.) as are shown in FIGS. 1 and 4. The energy of surround signals is typically spread along time and channels in order to produce the desired spatial audio effects (think of virtual sound sources moving through the living room). In many examples the same concept may apply to frequency. For speech signals it is well known that their spectral content varies greatly over time meaning that the signals do not occupy the entire spectrum at a given point in time. Accordingly, speech signals are often referred to as being "sparse". Embodiments of AEC process 10 may be configured to exploit the three dimensional sparsity of surround signals.

Originally, the $\mathcal{L}$-Max update scheme refers to the input vector of the adaptive filter. Once multiple filters are involved in parallel (e.g. MAEC), this concept may be generalized to the matrix of input vectors. Generally, this matrix may contain all three dimensions by stacking time-spectral matrices on top of each other for instance. Actually, the arrangement of the matrix does not matter. The $\mathcal{L}$-Max search may then be applied on these matrices in order to find the taps to be updated. This method generalizes the $\mathcal{L}$-Max update scheme in a straight forward manner, but has the clear disadvantage that the ordering becomes highly expensive.

As discussed above, AEC process 10 may include updating (608) the one or more adaptive audio filters based upon, at least in part, the analyzed audio reference signal. In some embodiments, AEC process 10 may apply a generic sparsity measure that is a bit different to the one proposed by Hoyer in "Non-negative Matrix Factorization With Sparseness Constraints," *Journal of Machine Learning Research*, vol. 49, pp. 1208-1215, (June 2001). Ours looks at the N×R matrix:

$$X := [\underline{x}_0, \underline{x}_1, \ldots, \underline{x}_{R-1}]^H, \underline{x}_r \in \mathbb{C}^N \quad \text{Equation 5}$$

The sparsity measure proposed here, is further based on the matrix H with entries:

$$h_{r,\mu} = \frac{|x_{r,\mu}|^2}{\frac{\gamma}{NR} \cdot \text{trace}\{X^H X\} + |x_{r,\mu}|^2} \quad \text{Equation 6}$$

The matrix H indicates for each entry $h_{r,\mu}$ to which extend it contributes to the overall (scalar) sparsity which we capture as:

$$S(X) := 1 - \frac{\gamma + 1}{NR} \cdot \sum_{r=1}^{R} \sum_{\mu=1}^{N} h_{r,\mu}.\quad\text{Equation 7}$$

Like the measure $S_{hoy}(\underline{x})$ given above, it also has the desired properties. The larger this metric is, the sparser the matrix X is. If only a single element $h_{r,\mu}$ is different from zero, which is the most sparse matrix possible, S(X) approaches 1. For a non-sparse matrix, e.g. all elements in X are identical, we have S(X)=0. Further, S(X)=S($\alpha \cdot$X) holds as well.

In contrast to $S_{hoy}(\underline{x})$, S(X) has a parameter $\gamma$ that can be used to adjust the dynamics of the measure. As a fundamental difference to $S_{hoy}(\underline{x})$ however, S(X) contains the matrix H which offers the possibility to treat each entry of X individually.

Now, consider the matrix X as the matrix of (complex valued) reference signal spectra, $\mu$ being the sub-band, or discrete frequency index and r is the index of the reference channels. Hence R=2 and N=257 means we have stereo AEC resolved in 257 sub-bands. We want to use H to decide which effort (in terms of filter adaptation) we will spend on performing AEC in the $\mu$-th sub-band and r-th channel. As an underlying rule to determine those efforts we consider:

$$\mathcal{Q} = 1 - S(X), \in [0\ 1]\quad\text{Equation 8}$$

Hence, it is understood that the sparser the signals the lower the effort that is necessary. If it were known that the signal X has a certain sparsity S(X), the matrix H could be used directly to determine the effort G that is required for filter adaptation: G=H. The number of filter taps $\mathcal{L}$ to be updated can then be determined by flooring. Note that rounding and ceiling may also be used, but either method may violate the constraint:

$$\mathcal{L} = [G \cdot L]\quad\text{Equation 9}$$

Here, L is the length of the sub-band filters, hence the number of filter taps per sub-band per channel.

In some embodiments, AEC process 10 may be configured to apply a constraint to the filter update process. These constraints may be based upon one or more set parameters. In some embodiments, the constraint may be configured to limit an amount of processing required to update the filters. In a practical scenario, the signal sparsity may be measured but will change according to the signal properties. Therefore, we assume a certain signal sparsity S(X) and impose a constraint on the total effort G:

$$\sum_{\mu=1}^{N}\sum_{r=1}^{R} g_{r,\mu} \stackrel{!}{=} \mathcal{Q} \cdot N \cdot R\quad\text{Equation 10}$$

Thereby, the efforts or processing capabilities available for filter adaptation are fixed to some predetermined value (percentage) $\mathcal{Q}$. As the actual signal sparsity will not be identical to the assumed sparsity, two cases have to be distinguished. Either the actual sparsity is greater or equal than the assumed sparsity or not. In the case that the signal is actually more sparse than assumed (or equal), hence we have more efforts to spend than necessary, we proceed as follows:

$$g_{r,\mu} = \mathcal{Q}' \cdot \alpha + \mathcal{Q}' \cdot (1-\alpha) \cdot h_{r,\mu}.\quad\text{Equation 11}$$

Thus, we choose to fade into a uniform effort-distribution and spend the remaining efforts equally on the signal portions with little energy. Additionally, we introduce an upper bound $\mathcal{Q}'$ to the resulting efforts. Thereby, efforts will be transferred to weaker signal portions once $\mathcal{Q}'$ has been allocated to the dominant regions. The parameter $\alpha$ finally, is determined by plugging Equation 11 into Equation 10 to meet the constraint given in Equation 10.

This results in:

$$\alpha = \frac{\frac{\mathcal{Q} \cdot N \cdot R}{\mathcal{Q}'} - \sum_{\mu=1}^{N}\sum_{r=1}^{R} h_{r,\mu}}{N \cdot R - \sum_{\mu=1}^{N}\sum_{r=1}^{R} h_{r,\mu}}.\quad\text{Equation 12}$$

In the case that we have too little efforts available, the sparsity distribution is simply rescaled to meet the constraint:

$$g_{r,\mu} = \frac{\mathcal{Q} \cdot N \cdot R}{\sum_{\mu=1}^{N}\sum_{r=1}^{R} h_{r,\mu}} \cdot h_{r,\mu}\quad\text{Equation 13}$$

In brief, the effort matrix reads:

$$G = \begin{cases} \mathcal{Q}' \cdot \alpha + \mathcal{Q}' \cdot (1-\alpha) \cdot H, & \frac{\mathcal{Q} \cdot N \cdot R}{\mathcal{Q}'} \geq \sum_{\mu=1}^{N}\sum_{r=1}^{R} h_{r,\mu} \\ \frac{\mathcal{Q} \cdot N \cdot R}{\sum_{\mu=1}^{N}\sum_{r=1}^{R} h_{r,\mu}} \cdot H, & \text{else} \end{cases}\quad\text{Equation 14}$$

Since it is clear now how many filter coefficients are allowed to be updated, AEC process 10 may determine which coefficients will actually receive the update. For this task different options exist, some of which may include, but are not limited to, $\mathcal{L}$-Max selection on the reference signals, random selection, and cyclic selection.

If the $\mathcal{L}$-Max selection is chosen, the adaptation procedure focuses on the temporally dominant frames. This way temporal sparsity may be exploited in addition to the spatio-spectral sparsity measured through S(X). The $\mathcal{L}$-Max selection mechanism has the advantage that it is designed to update those filter taps that correspond the largest filter input. Those that contribute the most to the remaining error. In that sense it focuses on the most important filter taps. The drawback is that it requires sorting the input vectors by their magnitude.

Sorting may be computationally expensive as well. In the subject application the vectors that have to be sorted are the signal buffers for the adaptive filters. As those buffers are sliding windows that loose one entry and get one new entry each time frame, the sorting can be implemented in an efficient manner sortline algorithm (see, I. Pitas, "Fast Algorithms For Running Ordering and Max/Min Calculation", *IEEE Transactions on Circuits and Systems*, vol. 36, no. 6, pp. 795-804, (June, 1989)).

In some embodiments, selecting the filter taps randomly avoids the sorting operation but does not focus on the most important signal components anymore. The performance of random selection will therefore be worse than that of $\mathcal{L}$-Max selection. Also, temporal sparsity is no longer exploited.

If temporal sparsity shall be exploited still, but without doing the $\mathcal{L}$-Max, there is another option. A sparsity analysis may be performed along time whereas the outcome is used as a pre-selection prior to randomly picking from those taps found by the sparsity measure. This can be achieved by arranging the matrix X along time and frequency for instance.

Additionally and/or alternatively, $\mathcal{L}$ out of L coefficients may be selected by picking every $\mathcal{L}$-th tap and shifting the start of this pulse train cyclically each frame. Once $\mathcal{L}$ changes due to a different effort allocation, the frequency of the pulse train changes accordingly. The cyclic selection method may also be combined with a sparsity pre-selection as for the random selection case.

In some embodiments, AEC process 10 may be implemented in a number of different configurations. Some embodiments disclosed herein rely upon on the matrix H for distributing the efforts. Depending on how the Matrix X is set up or how H is evaluated, different options may exist. Some of these may include, but are not limited to, Joint Spatio-Spectral Sparsity, Spectral Sparsity, Spatial Sparsity, and/or Combined Spatial and Spectral Sparsity.

Using the joint Spatio-Spectral sparsity approach, the columns of the matrix X are considered as (complex valued) reference signal spectra and the rows refer to the R channels. Since in multichannel AEC the channels are displayed from different spatial positions (positions of the loudspeakers), we refer to this kind of sparsity as "spatial sparsity". The spatial and the spectral sparsity are thus considered jointly and a certain number is assigned to each point in the spatio-spectral space ((r, μ)-tuples) via the matrix H (see Equation 6).

Additionally and/or alternatively, if there is only one reference channel (R=1), the above metric directly results in a purely spectral sparsity metric. However, for R>1 the spectral sparsity may also be assessed per channel:

$$h_r = \frac{|x_r|^2}{\frac{\gamma}{N} \cdot \{x_r^H, x_r\} + |x_r|^2}$$ Equation 15 resulting in an N-point vector along frequency. This vector may then be used on its own to assign the efforts, or may be combined with a spatial measure again (see below).

Additionally and/or alternatively, a purely spectral metric can also be obtained for R>1 by averaging the matrix H along the rows.

In some embodiments, the principle described above can be used vice versa to create a purely spatial method for distributing the efforts. For every sub-band μ the vector $\underline{x}_\mu := [x_0, x_1, \ldots, x_{R-1}]^H$ is analyzed across channels:

$$h_\mu = \frac{|x_\mu|^2}{\frac{\gamma}{R} \cdot \{x_\mu^H x_\mu\} + |x_\mu|^2}$$ Equation 16 resulting in a vector whose entries refer to the channels. Efforts may still be distributed for each sub-band, but the sparsity of the signal is only considered across channels.

Finally, a combined measure can be created by taking the element wise product of the spatial and the spectral measures:

$$H = [\underline{h}_0^T, \ldots, \underline{h}_\mu^T, \ldots, \underline{h}_{N-1}^T]^T \otimes [\underline{h}_0, \ldots, \underline{h}_r, \ldots, \underline{h}_{R-1}]$$ Equation 17

In this case the spectral and the spatial sparsity has not been assessed jointly but both contribute due to recombination.

In some embodiments, AEC process 10 may include determining at least one impulse response characteristic. Accordingly, the near-talk channel may be used to improve the distant talk ASR system in order to learn the room impulse responses characteristics, which may then be further exploited. Thus, the impulse response of the room may be determined and any distortions created by the room may be accounted for as necessary. Other embodiments may involve determining the impulse response of other areas (e.g. the inside of a vehicle, which may utilize AEC process 10, etc.). Determining the impulse response may be achieved using one or more microphones, which may be configured to record information such as audio data (e.g., a user's speech or some pre-recorded signal) in order to determine the impulse response. The microphones may be in communication with one or more computing devices, such as those described herein, which may be configured to calculate the impulse response. The nature and configurations of the microphones are discussed in further detail below.

Embodiments disclosed herein may be configured to support speech input via multi channel array microphones. In this way, television viewers may be able to sit comfortably in a living room environment and be able to speak commands, searches and messages to their television (e.g. television 43) via array microphones. The array may be configured to distinguish between users and the noise emanating from the television or other entertainment sources. In some embodiments, the array may be configured to follow speakers around the living room via visual input if they move from one seat to another, and should also support multiple speakers in the living that are sitting in different locations (in this case the system may be able to signal to the people in the room which person it is listening to at any particular moment). In some cases, this may be achieved using facial or gesture recognition technology. The system may also support a setting in which it can accept input from a restricted user set, in which case it may ignore all other speakers, or any user set, in which it listens to any user that speaks. The concept of voice biometrics may be explored to identify the user set. The system may also adapt to frequent speakers, of various ages and both genders, over time to improve overall performance.

In some embodiments, AEC process 10 may include optimizing the system using spatial filtering. More specifically, the near-talk channel may be used to improve the far-talk ASR system by optimizing one or more beamforming settings. For example, when an array of microphones is used the near-talk channel may provide results that may be used to tune the system.

It should be noted that the microphones associated with the embodiments of the present disclosure may be of any suitable design. Further, the microphones may be located in numerous electronic devices in addition to the near-talk and far-talk devices described herein. For example, one or more microphones may be located within a remote control device, a cellphone, tablet computing device, television, set-top-box, receiver, an in-vehicle system, and a hands-free telephone system, etc.

As discussed above, the near-talk channel often is available as an alternative channel in some applications such as a speech TV remote control with an additional built-in microphone or a head set in the case of distant-talk speech recognition software application. In other applications, an alternative additional channel is not readily available. In such an implementation, embodiments described herein may allow for the use of a smart phone or any other device.

Referring now to FIG. 4, an embodiment depicting a high-level architecture of an example system 400 configured to implement AEC process 10 is provided. System 400 may include far-talk device 402, near-talk device, 404, server computing device 406, and storage device 408. In this particular example, far-talk device 402 may correspond to a television or set-top-box while near-talk device 404 may correspond to a cellphone, tablet, remote control, or other suitable device. Devices 402 and 404 may communicate with server computing device 406 using an associated network interface.

Embodiments of AEC process 10 may utilize stochastic data models, which may be trained using a variety of domain data. Some modeling types may include, but are not limited to, acoustic models, language models, NLU grammar, etc.

Figure 5:
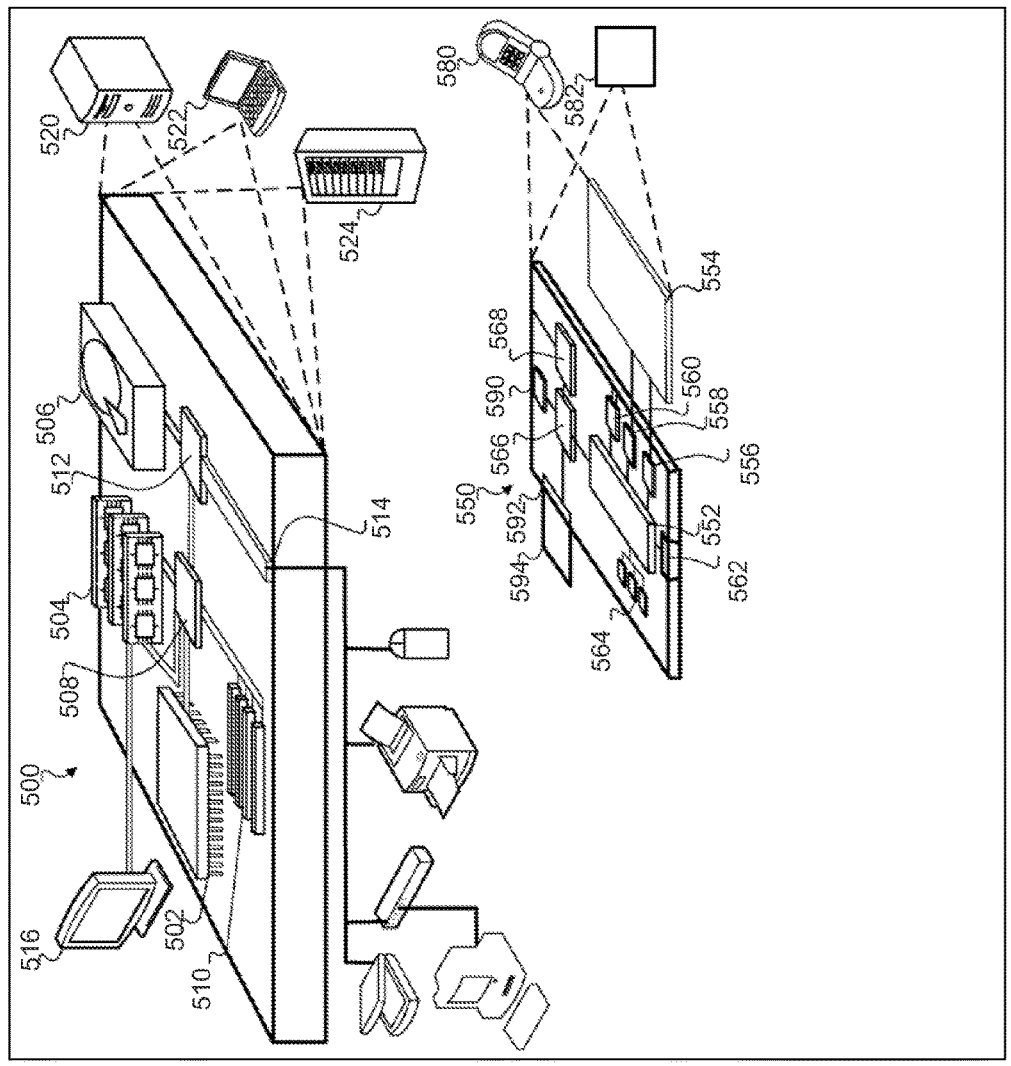
FIG. 5 shows an example of a computer device and a mobile computer device that can be used to implement the techniques described here.
Figure 6:
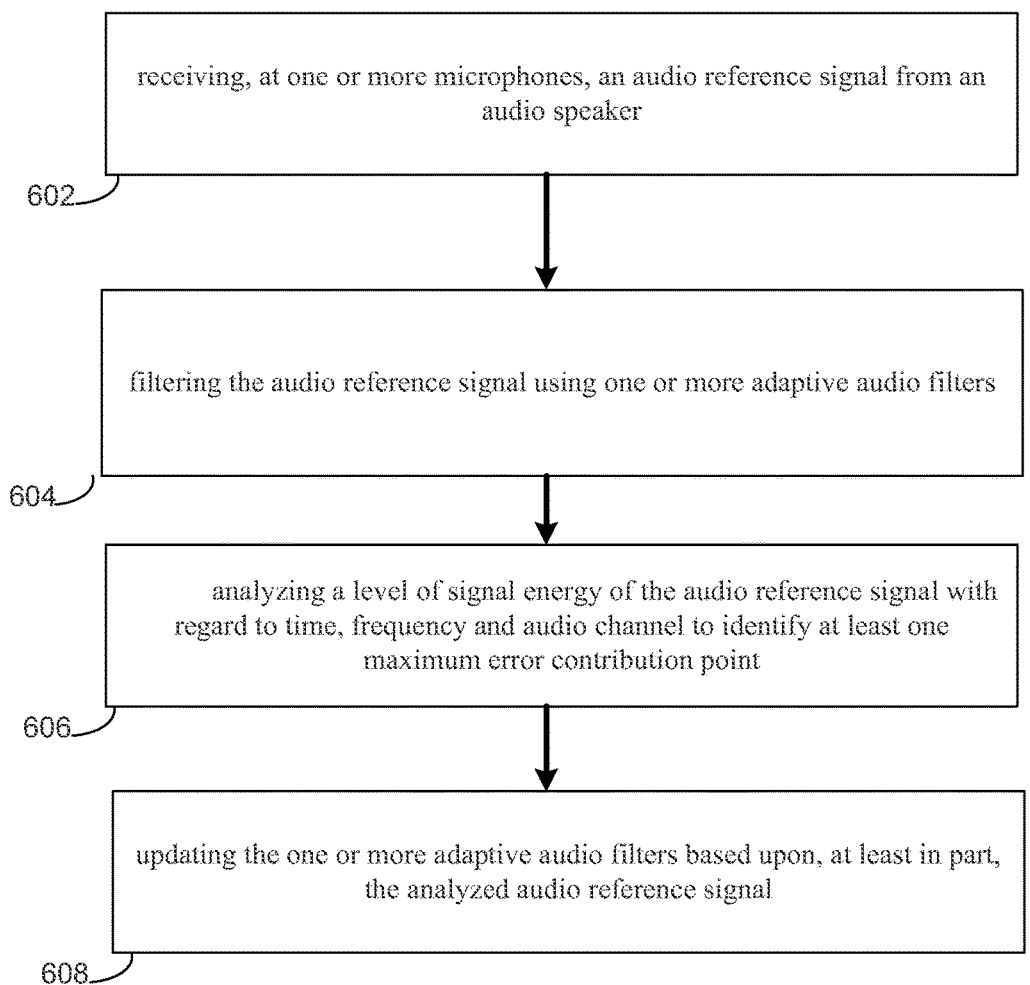
FIG. 6 is a flowchart of an acoustic echo cancellation process in accordance with an embodiment of the present disclosure.

Referring now to FIG. 5, an example of a generic computer device 500 and a generic mobile computer device 550, which may be used with the techniques described here is provided. Computing device 500 is intended to represent various forms of digital computers, such as tablet computers, laptops, desktops, workstations, personal digital assistants, servers, blade servers, mainframes, and other appropriate computers. In some embodiments, computing device 550 can include various forms of mobile devices, such as personal digital assistants, cellular telephones, smartphones, and other similar computing devices. Computing device 550 and/or computing device 500 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 500 may include processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, may be interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multiprocessor system).

Memory 504 may store information within the computing device 500. In one implementation, the memory 504 may be a volatile memory unit or units. In another implementation, the memory 504 may be a non-volatile memory unit or units. The memory 504 may also be another form of computer-readable medium, such as a magnetic or optical disk.

Storage device 506 may be capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

High speed controller 508 may manage bandwidth-intensive operations for the computing device 500, while the low speed controller 512 may manage lower bandwidth-intensive operations. Such allocation of functions is exemplary only. In one implementation, the high-speed controller 508 may be coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 may include a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, may be interconnected using various buses, and several of the components may be mounted on a common motherboard or in other manners as appropriate.

Processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

In some embodiments, processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

In some embodiments, memory 564 may store information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

Computing device 550 may be implemented in a number of different forms, as shown in the figure. For example, it may be implemented as a cellular telephone 580. It may also be implemented as part of a smartphone 582, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for acoustic echo cancellation comprising:
 receiving, at one or more microphones, an audio reference signal from an audio speaker;
 filtering the audio reference signal using one or more adaptive audio filters;
 analyzing a level of signal energy of the audio reference signal with regard to time, frequency and audio channel to identify at least one maximum error contribution point, wherein analyzing includes determining a plurality of coefficients for the one or more adaptive audio filters that contribute to the at least one maximum error contribution point; and
 updating a portion of the plurality of coefficients for the one or more adaptive audio filters that contribute to the at least one maximum error contribution point based upon, at least in part, the analysis of time, frequency and audio channel signal energy.

2. The method of claim 1, wherein updating includes applying an £-Max update based upon, at least in part, the analysis of time, frequency and audio channel signal energy.

3. The method of claim 1, wherein updating includes updating a sub-band adaptive filter.

4. The method of claim 1, wherein updating includes applying at least one sparse update to one or more sub-band adaptive filters.

5. The method of claim 1, further comprising: applying a constraint to updating based upon, at least in part, one or more set parameters, wherein the constraint is configured to limit an amount of processing required for updating.

6. The method of claim 1 wherein analyzing includes a sparsity determination.

7. The method of claim 2, further comprising: determining a particular sub-band filter to update.

8. The method of claim 1, wherein the microphone is associated with at least one of a voice controlled television, an in-vehicle system, and a hands-free telephone system.

9. The method of claim 1, wherein the acoustic echo cancellation system is a multi-channel acoustic echo cancellation system.

10. The method of claim 1, further comprising: removing an echo component associated with the audio reference signal.

11. A system for acoustic echo cancellation comprising:
 one or more processors configured to receive an audio reference signal from an audio speaker, the one or more processors further configured to filter the audio reference signal using one or more adaptive audio filters, the one or more processors further configured to analyze a level of signal energy of the audio reference signal with regard to time, frequency and audio channel to identify at least one maximum error contribution point, wherein analyzing includes determining a plurality of coefficients for the one or more adaptive audio filters that contribute to the at least one maximum error contribution point, the one or more processors further configured to update a portion of the plurality of coefficients for the one or more adaptive audio filters that contribute to the at least one maximum error contribution point based upon, at least in part, the analysis of time, frequency and audio channel signal energy.

12. The system of claim 11, wherein updating includes applying an £-Max update based upon, at least in part, the analysis of time, frequency and audio channel signal energy.

13. The system of claim 11, wherein updating includes updating a sub-band adaptive filter.

14. The system of claim 11, wherein updating includes applying at least one sparse update to one or more sub-band adaptive filters.

15. The system of claim 11, further comprising: applying a constraint to updating based upon, at least in part, one or more set parameters, wherein the constraint is configured to limit an amount of processing required for updating.

16. The system of claim 11 wherein analyzing includes a sparsity determination.

17. The system of claim 12, further comprising: determining a particular sub-band filter to update.

18. The system of claim 11, wherein the one or more processors are associated with at least one of a voice controlled television, an in-vehicle system, and a hands-free telephone system.

19. The system of claim 11, wherein the acoustic echo cancellation system is a multi-channel acoustic echo cancellation system.

20. The system of claim 11, further comprising: removing an echo component associated with the audio reference signal.

* * * * *